United States Patent [19]

Hoesterey et al.

[11] 4,034,949

[45] July 12, 1977

[54] OPTICAL APPARATUS

[75] Inventors: Howard Frederick Hoesterey, Santa Ana; John Weldon Cade, Orange, both of Calif.

[73] Assignee: Philco Corporation, Dearborn, Mich.

[21] Appl. No.: 456,606

[22] Filed: May 12, 1965

[51] Int. Cl.$^2$ .................................. F41G 7/00
[52] U.S. Cl. ........................ 244/3.16; 250/203 R; 350/6
[58] Field of Search .............. 250/83.3 IR, 203; 88/1 M; 244/3.11, 3.16

[56] References Cited

U.S. PATENT DOCUMENTS

| | | | |
|---|---|---|---|
| 2,418,137 | 4/1947 | Noell | 244/3.16 |
| 2,936,894 | 3/1960 | Bozeman | 244/3.11 |
| 2,947,872 | 8/1960 | Carbonara et al. | 250/203 |
| 3,226,721 | 12/1965 | Gould | 350/6 X |

*Primary Examiner*—Verlin R. Pendegrass
*Attorney, Agent, or Firm*—Robert D. Sanborn

EXEMPLARY CLAIM

1. In an optical tracking system, lens means defining an optical axis, radiant energy responsive means spaced from said lens means along said optical axis, a pair of radiant energy directing means disposed to be traversed by radiant energy passing along said optical axis from said lens means to said radiant energy responsive means, drive means for simultaneously rotating said radiant energy directing means whereby to rotate a beam of received radiant energy and cause the same to nutate about the optical axis and to trace a substantially circular image upon said radiant energy responsive means, and means for angularly adjusting one of said radiant energy directing means relative to the other to modify the radius of said circular image.

18 Claims, 5 Drawing Figures

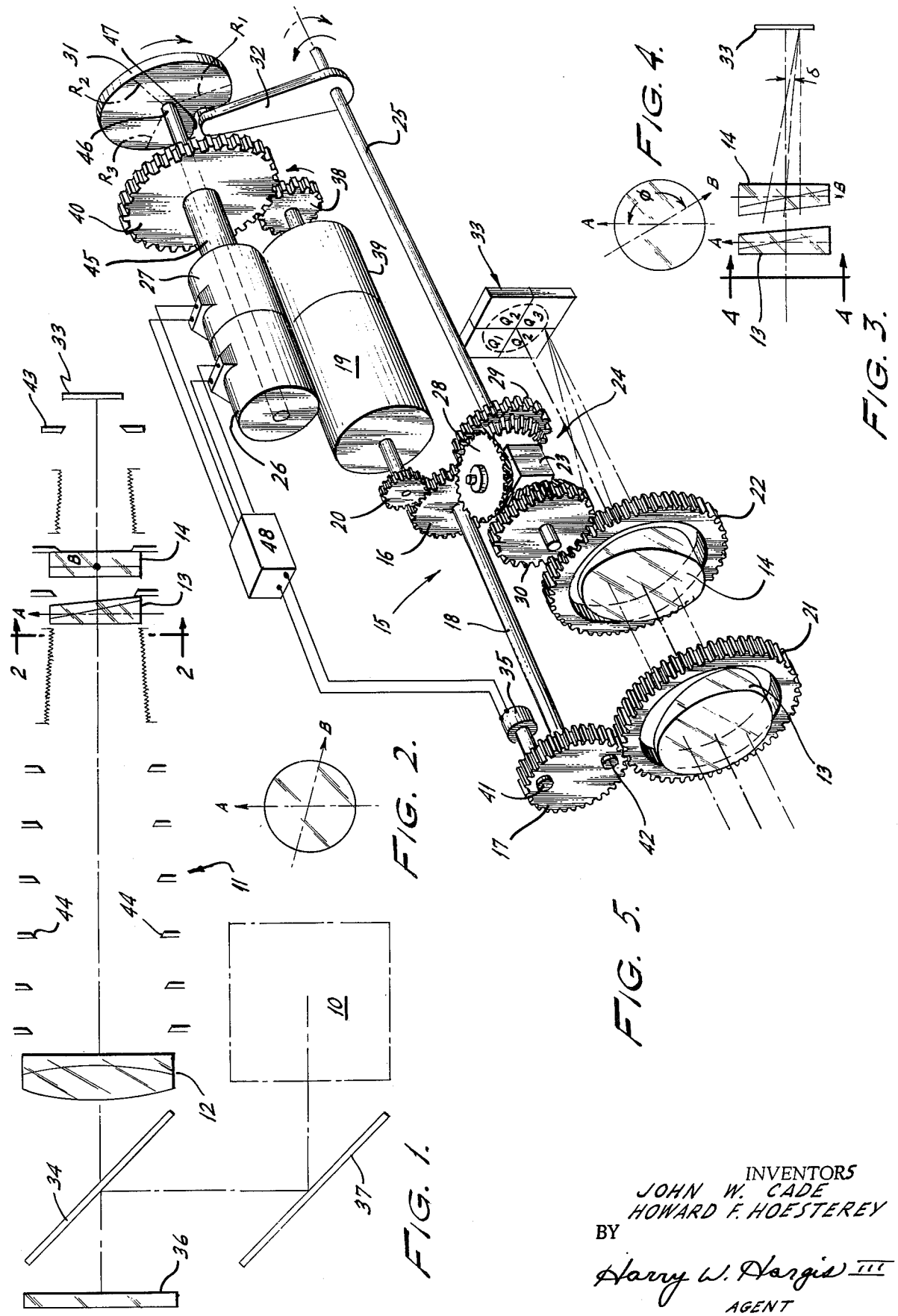

OPTICAL APPARATUS

This invention relates to optical apparatus, and is especially directed to an improved telescope particularly adapted for use in an optical sighting and tracking device.

In one known type of sighting and tracking device, an infrared telescope is used for sensing the flight path of a rocket or missile, for example, by tracking a heat radiating portion of the missile. The heat radiated by the missile is directed by the telescope onto a screen comprising a so-called "coding reticle" or quadrant detector array. Preferably, opto-mechanical means is provided to nutate the directed rays of received energy so as to trace a circular image upon the detector array and about the optical axis of the telescope. Electronic means is provided in combination with the quadrant detector array to determine the position of the heat source —and thence the missile— in space, relative to the optical axis of the telescope.

A disadvantage of such apparatus is that the radius of the scanned circle is reduced in proportion to the increase in distance of the missile from the tracking apparatus. This condition has been found to be a source of difficulty in achieving accurate indication of the location of the missile. One such sighting and tracking device is disclosed and claimed in the copending application of Jack L. Johnson et al., Ser. No. 148,092, filed Oct. 27, 1961, and assigned to the assignee of the present invention. Disclosure of certain background features of the present invention appears in the referenced copending application, while the present case discloses and claims improved apparatus.

The aforementioned problem has been countered in certain known sighting and tracking devices through provision or means for keeping the nutation circle diameter constant by changing the focal length of the telescope objective lens system, using for example a zoom lens, in accordance with a predetermined program based on the rate of increase in range of the missile in its flight.

A number of disadvantages of such prior art apparatus preclude achievement of the desired tracking accuracy under environmental temperature extremes of $-65°$ to $+165°$ F, and under extreme vibration conditions such as are encountered in armored vehicles. Some disadvantages characteristic of prior art devices using zoom lenses are that:

Zoom lens apparatus is limited for practical purposes to about a 5-to-1 change in focal length, and this is not sufficient to achieve the desired uniform image size for the longer ranges; zoom lens apparatus comprises movable elements of extended lengths that make it difficult to maintain alignment under severe environmental conditions, and tracking accuracy is dependent upon the critical alignment of optical components; and substantial power is required to move such relatively massive optical elements for long linear distances, thereby making it difficult to achieve the required speed of adjustment.

The present invention has as a general objective the provision of improved means for overcoming the foregoing as well as other difficulties, and the invention is characterized by the combination of an infrared tracking telescope with rotatably adjustable means for maintaining the radius of the scanned circle constant as the range of the missile increases. This improvement amounts to modifying the optical gain of the telescope without changing its linear dimensions.

In further and more particular accordance with the invention, the telescope comprises a lens and a pair of relatively angularly movable rotatable optical elements, preferably prisms or wedges, that are cooperable to direct a beam of infrared radiation from a receding missile onto a screen comprising a quadrant detector array, and to nutate said beam and trace a circular image upon said detector array. One prism is angularly movable with respect to the other prism about an axis common to both prisms, and both prisms are so disposed and adapted as to displace the tracing spot in accordance with their relative angular positional relationship. Means comprising a differential gear drive for rotating the relatively movable prism is operable, preferably in accordance with a predetermined program based on the rate of change in range of a missile being tracked, to vary the relative angular position and maintain the desired size of the scanned image.

For a more complete understanding of the present invention, and of the manner in which it achieves the foregoing and other objectives, reference is made to the following description taken in light of the accompanying drawing, in which:

FIG. 1 is a somewhat diagrammatic view of an optical system embodying the present invention;

FIG. 2 is a view looking in the general direction of arrows 2—2 applied to FIG. 1;

FIG. 3 is a view of portions of the system shown in FIG. 1, and illustrating certain of the optical characteristics of apparatus embodying the invention;

FIG. 4 is a view looking in the direction of arrows 4—4 applied to FIG. 3; and

FIG. 5 is a showing, in perspective, of a mechanical drive system associated with the optical system illustrated diagrammatically in FIG. 1.

With more particular reference to FIG. 1, the optical system includes a sighting telescope 10 and an infrared tracking telescope 11, each telescope having its optical axis closely adjacent and parallel to that of the other telescope as well as to the longitudinal axis of the weapon (not shown) from which a missile is launched or fired. The sighting telescope is of conventional construction and need not be shown or described in detail. The infrared telescope 11, in particular accordance with the invention, comprises an infrared achromatic cemented doublet lens 12 and a pair of achromatic prisms 13 and 14 optically aligned with lens 10. Infrared telescope 11 further includes a plurality of radiant energy baffle means designated generally by the numeral 44, and an adjustable field stop iris 43 confronting a radiant energy responsive means, for example, the quadrant detector array 33 preferably disposed in the focal plane of the telescope.

As shown, both of prisms 13 and 14 are rotatable about the optical axis of the system (they could also rotate about a skewed axis). In particular accordance with our invention, prism 14 is further rotatable relative to prism 13. Means for achieving the various rotations of the prisms will now be described in detail.

It is the simultaneous rotation of the prisms that produces the circular image on the quadrant array 33, as also will hereinafter be more fully described. Prism 14 is rotatable through a maximum angle of about 94° with respect to prism 13 to produce a desired 10 to 1 change in nutation radius.

FIGS. 3 and 4 illustrate the relative positioning of the prisms 13 and 14 to achieve the image radius required at maximum missile range, and FIGS. 1 and 2 illustrate their relative positioning to achieve the radius required at minimum missile range.

With reference particularly to FIGS. 3 and 4, the angular deviation of the nutationally formed circular image from the optical axis is related to the angular deviation produced by each prism with respect to the optical axis in accordance with the following relationship:

$$\delta = 2\omega \cos\left(\frac{\phi}{2}\right)$$

where $\omega$ is the rotational angular deviation produced by each prism, and $\phi$ is the angle between the planes containing the deviation angle $\omega$ or between reference arrows A and B through centers of the prisms as shown. Changes in $\delta$ are substantially linear for values of $\phi$ in the range of 90° to 180°. Disclosure of the detailed specifications of the various optical elements per se is not required herein, and will not be undertaken.

FIG. 5 illustrates a mechanical device 15 for changing the angular position of prism 14 relative to prism 13. This device comprises prism drive gears 16 and 17 mounted on a rotatable shaft 18. Gears 16 and 17 are arranged to be driven through gear 20 at a predetermined angular rate, for example, at a rate of about 30 cycles per second by a suitable continuously running motor 19. A voltage pulse is generated in a magnetic pick-up 35 by the movement of two slugs 41 and 42 of ferromagnetic material mounted 180° apart on the gear 17. The gear ratios are such that the pulse frequency is 120 cycles per second, and these pulses are used as a timing reference for the control circuit means 48. Prisms 13 and 14 are attached to suitably mounted prism drive gears 21 and 22, which are driven, respectively, by gears 17 and 16. In the absence of a further drive input to the gear system, gears 21 and 22 will be driven at equal speed. While gear 17 is coupled directly with gear 21, gear 16 is drivingly coupled with gear 22 through differential gearing 24 including a spider 23 keyed to a rotatably mounted shaft 25. Gearing 24 further includes a bevel gear 28 rotatably mounted on spider 23 and meshed with beveled tooth portions of gear means 29 and 30, which gear means are free to rotate on shaft 25. In the hereinabove described arrangement, prisms 13 and 14 are driven at the same speeds except when the spider 23 of the differential 24 is rotated by shaft 25 to which it is keyed. Shaft 25 is rotated in response to predetermined signals directed from control circuit means 48 to respective brake and clutch 26 and 27, as will now be described.

Drive motor 19 is coupled to gear 38 through a speed reducer 39, and gear 38 is arranged to drive a gear 40 rotatable with a shaft 45 and cooperable with clutch 27 selectively to drive a concentric shaft 46 that carries a cam 31. Brake 26 is operable to prevent shaft 46, and the cam 31, from being rotated when clutch 27 is deactivated. Release of the brake 26 and energization of the clutch 27 provides for rotation of cam 31, through shaft 46, in the direction of the rotational arrow applied thereto, to displace a cam follower 32 comprising an arm fixed to shaft 25, and in the direction of the solid line arrow applied to the latter. Due to the angular motion of the cam follower, shaft 25 is rotated through a progressively increasing angle determined by the rise in the cam. The rise in cam 31 is illustrated diagrammatically by radial lines applied thereto and related to one another by the general expression $R_1 < R_2 < R_3$. Rotation of shaft 25 in the direction of the solid arrow adds to the velocity of gear 22, through operation of the differential gearing 24, to cause a corresponding displacement of prism 14 with respect to prism 13, thereby changing the radius of the circular image on the quadrant detector array 33. After the programmed change in the angular disposition of prism 14 has been carried out for the purpose intended, follower 32 drops into the notched portion 47 of cam 31, whereby shaft 25 is rotated in the direction of the broken line arrow. This completes the tracking cycle, and is accompanied by deenergization of clutch 27 and energization of brake 26 by control circuit 48.

Considering operation of the hereinabove described tracking means in more detail, motor 19 is running continuously upon activation of the firing circuit of control means 48 for the launching device (not shown), so that gears 20 and 38 are being driven at constant angular velocity. Under these conditions prisms 13 and 14 and gear 40 are being rotated at their respective uniform angular velocities. On command derived from activation of the firing circuit of control means 48, brake 26 is released and clutch 27 is engaged causing cam drive shaft 25 to be driven at its predetermined uniform angular velocity by gears 38 and 40. Resultant rotation of cam 31 (see solid directional arrow) causes follower 32 and attached shaft 25 to be rotated (solid directional arrow), thereby rotating spider 23. Rotation of the spider effects differential rotation of gear 22 and its prism 14 with respect to gear 21 and its prism 13, whereby there is provided the programming to achieve the desired (usually circular) trace on the detector array 33. Cam 31 is so shaped and driven as to rotate prism 14 relative to prism 13 at a rate so related to the rate of increase in range of the missile as to establish a nutated image of substantially uniform diameter without a change in boresight.

Considering the apparatus of the invention in additional detail, the sighting telescope 10 is the means by which the operator of the weapon views the target and uses it as a reference in establishing the correct optical line of sight for guiding the missile in its flight. The operator maintains the optical axis of the sighting telescope on the target throughout the flight of the missile to the target, all as set forth in the mentioned copending disclosure of Johnson et al. This manner of sighting and tracking necessitates that the optical axes of both the visual sighting telescope 10 and the tracking telescope 11 substantially coincide. Such relative positioning may be achieved readily by constructing sighting telescope 10 and tracking telescope 11 closely adjacent one another in a common frame (not shown).

Reviewing further the relationship between the two telescopes, and in the interest of better understanding of advantages deriving from the invention, a beam splitter 34 is disposed between the window 36 and the objective lens 12 of telescope 11 and the like lens (not shown) of telescope 10. Beam splitter 34 includes means for combining the image of the target with a reticle pattern (not shown). Radiation transmitted through window 36 is divided by beam splitter 34, so that visible energy is reflected onto a mirror 37 mounted below beam splitter 34 and directed into the objective lens of sighting telescope 10, and infrared energy is passed through beam splitter 34, into the tracking telescope 11 and is directed onto quadrant array 33.

The quadrant array is associated with suitable means for determining the deviation of an infrared energy source at the missile from the line of sight to the target, as viewed through the sighting telescope 10. Such means is disclosed and claimed in the referenced Johnson et al. application. Any deviation is converted to error signals or electrical outputs, in pulse modulated form, from which azimuthal and elevational components of deviation can be derived. These error signals are then used as a basis for missile guidance, also in accordance with teachings of the referenced application. The error signal generating elements of the array comprise four independent infrared detectors $Q_1$, $Q_2$, $Q_3$ and $Q_4$ disposed within the focal plane of the telescope. The infrared image is nutated optically by prisms 13 and 14 over the four detector surfaces of array 33 so that the time duration in which infrared energy from the missile source impinges upon each of the surfaces $Q_1$ to $Q_4$ is used to indicate the deviation of the missile from the line of sight in accordance also with the disclosure of the copending Johnson et al. application. For zero deviation, the image is nutated concentrically with the center of the four detecting surfaces so that the time duration of the image on each detector is the same. As the deviation increases, the circle departs from its centered position and the dwell time on the quadrants is changed.

It is preferred that the radius of the detector be at least twice the nutation radius, since this relationship has been found to achieve the most satisfactory operation under a wide number of conditions. As discussed previously, the linear gain of the tracker, or the error signal per meter of missile deviation, should be kept constant for proper guidance of the missile. This requires that the angular gain $\delta$ be increased with increasing range of the missile, since the nutation radius decreases with increasing range of the missile. The nutation radius therefore is programmed as a function of missile range from the tracker to keep the tracker linear gain constant with range. In accordance with the present invention, the tracker gain, a function of nutation radius, is determined by the relative angular displacements $\omega$ of the two rotating prisms, as provided by the differential adding and subtracting means. It will be understood of course that, in apparatus of the type disclosed, only small missile excursions are permissible between the tracker and the target line of sight, so that the missile must be guided from muzzle exit to maximum range.

From the foregoing description, it will be appreciated that the present invention affords simple and effective means for modifying the gain of a tracking telescope without having to change its linear dimensions. While a preferred embodiment of the invention has been disclosed, it will be understood that the invention is susceptible of such modifications as may fall within the scope of the appended claims.

We claim:

1. In an optical tracking system, lens means defining an optical axis, radiant energy responsive means spaced from said lens means along said optical axis, a pair of radiant energy directing means disposed to be traversed by radiant energy passing along said optical axis from said lens means to said radiant energy responsive means, drive means for simultaneously rotating said radiant energy directing means whereby to rotate a beam of received radiant energy and cause the same to nutate about the optical axis and to trace a substantially circular image upon said radiant energy responsive means, and means for angularly adjusting one of said radiant energy directing means relative to the other to modify the radius of said circular image.

2. An optical tracking system according to claim 1 and characterized in that said radiant energy directing means comprises a pair of optical prisms.

3. A tracking system according to claim 1 and characterized in that said last recited means is operable, angularly to adjust said one radiant energy directing means relative to the other at an angular velocity that is a function of the rate of change in range of an object undergoing tracking, said angular velocity being of a value effective to maintain the radius of said circular image at a predetermined substantially fixed value.

4. A system according to claim 1 and characterized in that said last recited means comprises a differential drive means including: a rotatable shaft; a pair of spaced gears coaxially disposed for rotation upon and with respect to said shaft, one of said gears supporting said one radiant energy directing means and the other of said gears being disposed and adapted for rotation by said drive means; a spider keyed to said shaft; a gear rotatably mounted upon said spider and meshed with said pair of gears in provision of driving connection between said drive means and said one gear; and means for rotating said shaft angularly to position said spider and effect the recited angular adjustment of the one light directing means.

5. A system according to claim 4, and further characterized in that said means for rotating said shaft comprises: a cam driven by said drive means; and a cam follower coupled with said shaft and operable to rotate the latter.

6. A system according to claim 1 and characterized in that said radiant energy responsive means comprises a quadrant detector array.

7. A system according to claim 1 and further characterized in that said last recited means is operable to reposition said one prism relative to the other at a uniformly changing rate of speed.

8. In combined sighting and tracking apparatus for use in a vehicle to aim and track an energy radiating missile launched therefrom, optical means comprising: means for establishing a line of sight; and a tracking device aligned with the line of sight and including an array of adjacent detectors, a pair of rotatable radiant energy directing means disposed to be traversed by a beam of energy radiated from said missile, and operable to nutate a beam of the radiant energy received from the missile upon said array, and means for rotatably positioning one of said energy directing means relative to the other to control the radius of the traced image in accordance with the change in range of said missile.

9. Apparatus according to claim 8 and characterized in that said last recited means is operable to maintain a substantially uniform radius of the traced image.

10. In combined sighting and tracking apparatus for use in a vehicle to aim and track a missile launched therefrom, optical means comprising: a device for establishing a line of sight; and a tracking device optically aligned with the line of sight and including a screen, a pair of rotatable optical prisms optically aligned with said screen and operable to nutate a beam of the radiant energy received from the missile upon said screen, and means for rotatably positioning one of said prisms relative to the other to establish a beam trace of substantially uniform radius on said screen in accordance with the change in range of said missile.

11. Apparatus according to claim 9 and characterized in that said screen comprises a quadrant detector array, and in that said last recited means comprises differential adding and subtracting means.

12. An optical system comprising: an objective lens arranged on an optical axis of the system; a first lens spaced from said objective lens along the optical axis of the system, said first lens having a face presented toward said objective lens and perpendicular to said optical axis and a face opposite to the first disposed with angularity to the optical axis; a second lens spaced from said first lens along the optical axis and having a face angularly disposed as respects the optical axis and facing the angularly disposed face of the said first lens, and a face opposite its angularly disposed face and perpendicular to the optical axis; screen means disposed in the focal plane of the recited lens system for receiving an image of rays entering said objective lens and passing through said first and second lenses; means for rotating said first and second lenses about said optical axis whereby to nutate said image upon said screen means; and means for relatively angularly displacing said first and second lenses to modify the radius of a nutational image directed onto said screen means.

13. In combined sighting and tracking apparatus for use in a vehicle to aim and track a missile launched therefrom, optical means comprising: a sighting device including reticle means for establishing a line of sight; and a tracking device optically aligned with the line of sight and including a detector array, a pair of rotatable optical prisms optically aligned with and spaced at fixed distances from said array, said prisms being operable to nutate an image of radiant energy received from the missile and directed upon said detector array, and means for rotatably positioning one of said prisms relative to the other to establish a nutational image of substantially uniform size on said detector array upon a change in range of said missile.

14. In combined sighting and tracking apparatus for use in a vehicle to aim and track a missile launched therefrom, optical means comprising: means for establishing a line of sight; and means for tracking optically aligned with the line of sight and including an objective lens, a screen spaced a predetermined fixed distance from said objective lens, and a pair of rotatable optical prisms spaced a fixed distance from said objective lens and optically aligned with the latter and said screen, said prisms being operable to nutate an image of radiant energy received from said missile and directed by said objective lens upon said screen, and means for rotatably positioning one of said prisms relative to the other to establish a nutational image of substantially uniform size on said screen upon the change in range of said missile.

15. In an optical system, an objective lens defining an optical axis of the system, a screen spaced from said lens along the said optical axis and disposed in the focal plane of said lens, a pair of simultaneously rotatable optical prisms optically aligned with and spaced at fixed distances from said objective lens and from said screen, said prisms being cooperable to nutate an image of radiant energy directed by said lens onto said screen, and means for rotatably repositioning one of said prisms relative to the other to modify the radius of the nutated image.

16. An optical system according to claim 15, and characterized in that said recited elements comprise tracking means for a heat radiating object moving at a predetermined velocity away from said system, whereby the radius of the nutated image tends to decrease as a function of the distance the object moves away, said system including means for programming the rotatable repositioning of the recited prism relative to the other whereby to maintain the radius of the nutated image at a predetermined desired value.

17. In an optical tracking system, lens means defining an optical axis, radiant energy responsive means spaced from said lens means along said optical axis, a pair of radiant energy directing means disposed to be traversed by radiant energy passing along said optical axis from said lens means to said radiant energy responsive means, drive means for simultaneously rotating said radiant energy directing means whereby to rotate a beam of received radiant energy and cause the same to rotate about the optical axis and to trace a circular image upon said radiant energy responsive means, and means for effecting differential angular movement of one of said radiant energy directing means relative to the other as they are rotated simultaneously, whereby to modify the radius of said circular image.

18. A system according to claim 17 and characterized in that said drive means comprises first and second gear means operable to rotate said radiant energy directing means, said second gear means including a driving gear and a planetary gear train driven thereby, said planetary train being rotatable independently of said driving gear, and thereby operable angularly to move the one radiant energy directing means, to modify the radius of said circular image.

* * * * *